(12) United States Patent
Koonce et al.

(10) Patent No.: US 10,371,164 B2
(45) Date of Patent: Aug. 6, 2019

(54) FIXTURE MOUNT ASSEMBLY

(71) Applicant: L70 Technologies, LLC, Naples, FL (US)

(72) Inventors: Matthew Bingham Koonce, Excelsior, MN (US); Jonathan Owen Soucoup, Savage, MN (US)

(73) Assignee: L70 Technologies, LLC, Naples, FL (US)

( * ) Notice: Subject to any disclaimer, the term of this patent is extended or adjusted under 35 U.S.C. 154(b) by 0 days.

(21) Appl. No.: 15/040,342

(22) Filed: Feb. 10, 2016

(65) Prior Publication Data

US 2017/0016463 A1  Jan. 19, 2017

Related U.S. Application Data

(60) Provisional application No. 62/192,372, filed on Jul. 14, 2015.

(51) Int. Cl.
| | |
|---|---|
| *F04D 29/34* | (2006.01) |
| *F16M 13/02* | (2006.01) |
| *F16B 2/12* | (2006.01) |
| *F21V 21/088* | (2006.01) |

(52) U.S. Cl.
CPC ............... *F04D 29/34* (2013.01); *F16B 2/12* (2013.01); *F16M 13/02* (2013.01); *F21V 21/088* (2013.01); *Y10T 403/34* (2015.01)

(58) Field of Classification Search
CPC .. F21V 21/00; Y10T 403/342; Y10T 403/347; Y10T 403/341; Y10T 403/34; Y10T 403/7067; Y10T 403/7062; Y10T 403/7066; F16B 2/12; F16B 13/02

USPC ....... 248/342, 343, 344, 540, 51; 416/210 R, 416/207, 208
See application file for complete search history.

(56) References Cited

U.S. PATENT DOCUMENTS

| | | | | | |
|---|---|---|---|---|---|
| 1,635,315 | A | * | 7/1927 | Ehinger | F04D 29/362 416/163 |
| 1,635,840 | A | * | 7/1927 | Haw | B64C 11/24 29/889.6 |
| 1,924,349 | A | * | 8/1933 | Charavay | B64C 11/065 416/207 |
| 2,232,670 | A | * | 2/1941 | Barrett | F04D 29/36 416/207 |
| 2,395,193 | A | * | 2/1946 | Place | F04D 29/34 415/132 |
| 2,765,859 | A | * | 10/1956 | Hartzell | F04D 29/34 416/207 |

(Continued)

OTHER PUBLICATIONS

"Autobahn ATBS Installation (video)", YouTube, [Online]. Retrieved from the Internet: <URL: https://www.youtube.com/watch?v=3HRKg6TB-u0>, (Jan. 12, 2015), 2 minutes, 40 seconds.

*Primary Examiner* — Kimberly T Wood
(74) *Attorney, Agent, or Firm* — Schwegman Lundberg & Woessner, P.A.

(57) ABSTRACT

A fixture mount assembly for coupling with a support includes a fixture mount configured for mounting one or more fixtures on a support. The fixture mount includes a fixture body surrounding a wiring cavity, and one or more fixture coupling features extending from the fixture body. A grasping clamp is coupled with the fixture body. The grasping clamp is configured to grasp the support in an installed configuration.

25 Claims, 9 Drawing Sheets

(56) References Cited

U.S. PATENT DOCUMENTS

| | | | | |
|---|---|---|---|---|
| 2,908,469 A * | 10/1959 | Mack | ............... | F16B 9/026 |
| | | | | 248/230.5 |
| 2,918,977 A * | 12/1959 | Fedan | ............... | F04D 29/34 |
| | | | | 416/214 R |
| 3,071,683 A * | 1/1963 | Queale | ............... | F21S 8/086 |
| | | | | 248/214 |
| 3,184,199 A * | 5/1965 | Clark | ............... | F21V 21/116 |
| | | | | 248/230.1 |
| 3,328,575 A * | 6/1967 | Waldbauer | ............... | F21S 8/086 |
| | | | | 362/308 |
| 3,387,866 A * | 6/1968 | Baldwin | ............... | F21S 8/086 |
| | | | | 248/230.3 |
| 3,652,047 A * | 3/1972 | Starr | ............... | F21V 21/116 |
| | | | | 248/219.2 |
| 4,634,341 A * | 1/1987 | Monroe | ............... | F01D 7/00 |
| | | | | 415/129 |
| 5,520,515 A * | 5/1996 | Bailey | ............... | F04D 29/36 |
| | | | | 416/208 |
| 6,250,886 B1 * | 6/2001 | Immell | ............... | F04D 29/388 |
| | | | | 416/214 R |
| 6,364,612 B1 * | 4/2002 | Tseng | ............... | F04D 25/088 |
| | | | | 416/133 |
| 7,214,035 B2 * | 5/2007 | Bussieres | ............... | F01D 5/025 |
| | | | | 416/207 |
| 8,759,676 B1 * | 6/2014 | Gretz | ............... | H02G 3/185 |
| | | | | 174/50 |
| 9,028,087 B2 * | 5/2015 | Wilcox | ............... | F21V 27/00 |
| | | | | 362/101 |
| 9,212,812 B2 * | 12/2015 | Kinnune | ............... | F21V 29/763 |
| 9,435,519 B2 * | 9/2016 | Kinnune | ............... | F21V 29/74 |
| 2014/0049961 A1 * | 2/2014 | Wilcox | ............... | F21V 5/04 |
| | | | | 362/244 |

* cited by examiner

FIXTURE MOUNT ASSEMBLY

CLAIM OF PRIORITY

The present application claims the priority of U.S. Provisional Patent Application Ser. No. 62/192,372, filed Jul. 14, 2015, which is hereby incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Energy Management Collaborative, LLC; Plymouth, Minn. USA. All Rights Reserved.

TECHNICAL FIELD

This document pertains generally, but not by way of limitation, to fixture mounts in electrical, lighting, audio and instrumentation applications.

BACKGROUND

Fixtures, such as light fixtures, are installed at varying heights and orientations according to the desired application. For instance, when used in a parking lot light fixtures are mounted to supports, such as light posts, that elevate the fixtures to provide a wide application of light to the parking lot. Similarly, other fixtures, such as loudspeakers, hangers, instruments or the like are at times installed on supports to provide a desired placement for the fixture.

In at least some examples each fixture has a varied installation footprint including a bracket or plate having a plurality fasteners or fastener features (e.g., holes) provided in a pattern unique to the fixture. The installer uses a template or measures the position of the fastener features and then forms corresponding fastener features on the support. For instance, the installer measures the pattern of fastener features and then drills a corresponding set of fastener features in the support. This process is repeated for each fixture coupled with the support. For example, with a light post that will position four light fixtures, the installation footprint is drilled into the support four times, once for each fixture. After preparation of the support each of the fixtures is coupled to the support, for instance with bolts, screws or rivets driven through the fastener features on each of the fixtures and the corresponding features formed on the support.

OVERVIEW

The present inventors have recognized, among other things, that a problem to be solved can include minimizing the difficulty of fixture installations, use of specialized fixture mounts unique to each fixture style and normalizing one or more of support (post or pole) configuration and size. For instance, because there are numerous types of fixtures and corresponding installation footprints for the fixtures (e.g., fastener patterns, brackets or the like) the installer invests time and labor in measuring each footprint or using a template to duplicate (e.g., drill) the footprint on a support, such as a light post. Further, fixtures and supports are in some examples heavy and cumbersome making measurement and duplication of the footprint difficult. Additionally, where multiple fixtures are designated for installation on a support the process of duplicating the installation footprint for a fixture is repeated or done again if a differing fixture is used. Furthermore, the installer spends time and effort researching and installing mounting accessories to mate up a specified fixture with a specified pole or post type (e.g., varied in size, shape, taper or the like). Stated another way, in some examples the installer must select or alter the footprint, select different mounting accessories or the like according to the configuration of the pole or post.

The present subject matter can help provide a solution to this problem, such as by providing a fixture mounting assembly interposed between the fixtures and the support. The fixture mounting assembly provides a plurality of fixture anchors spaced around the fixture mount. The fixture anchors optionally include ports and clamps that readily receive and fasten fixture adapters to the fixture mounting assembly (and the associated support) at the corresponding locations of the anchors. The fixture adapters include a variety of fixture interfaces that are prepared beforehand (e.g., molded, machined, prepared on site or the like) and immediately ready for coupling with the corresponding fixture type. A mount interface of each of the adapters provides a consistent shape (e.g., profile) that is readily received through the corresponding fixture ports of the fixture mounting assembly and clamped by a fixture clamp. In one example, fixture adapters having differing fixture interfaces are provided separately or with the fixture mount (e.g., a fixture body configured for coupling with the support) to facilitate the rapid coupling of any corresponding fixtures to a support with little to no preparation of the support in the time and labor intensive manner described. Stated another way, varying fixture styles are coupled quickly and reliably to a support with the fixture mounting assembly.

In another example, the fixture mounting assembly includes a grasping clamp that quickly and reliably couples the fixture mount and fixtures coupled with the fixture mount to the support (e.g., a light posts, utility pole or the like). The grasping clamp provides a plurality of engagement faces that are movable relative to the mount body (e.g., along bracket guides). Movement of the engagement faces, for instance by operation of a fastener, clamps the support between the faces and fastens the fixture mount reliably with the support. Multiple fastener holes, and corresponding fasteners delivered through the holes are not needed to robustly couple the fixture mounting assembly with the support. Further, the grasping clamp facilitates the coupling of the fixture mounting assembly (and the fixtures coupled with it) to a variety of differing supports such as posts and poles that have variations in size, shape, taper and the like. For instance, the grasping clamp facilitates installation of the fixture mounting assembly with supports including, but not limited to, round, square, tapered supports having diameters or dimensions of between at least 3.5 to 6.5 inches.

This is intended to provide an overview of subject matter of the present patent application. It is not intended to provide an exclusive or exhaustive explanation of the disclosure. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
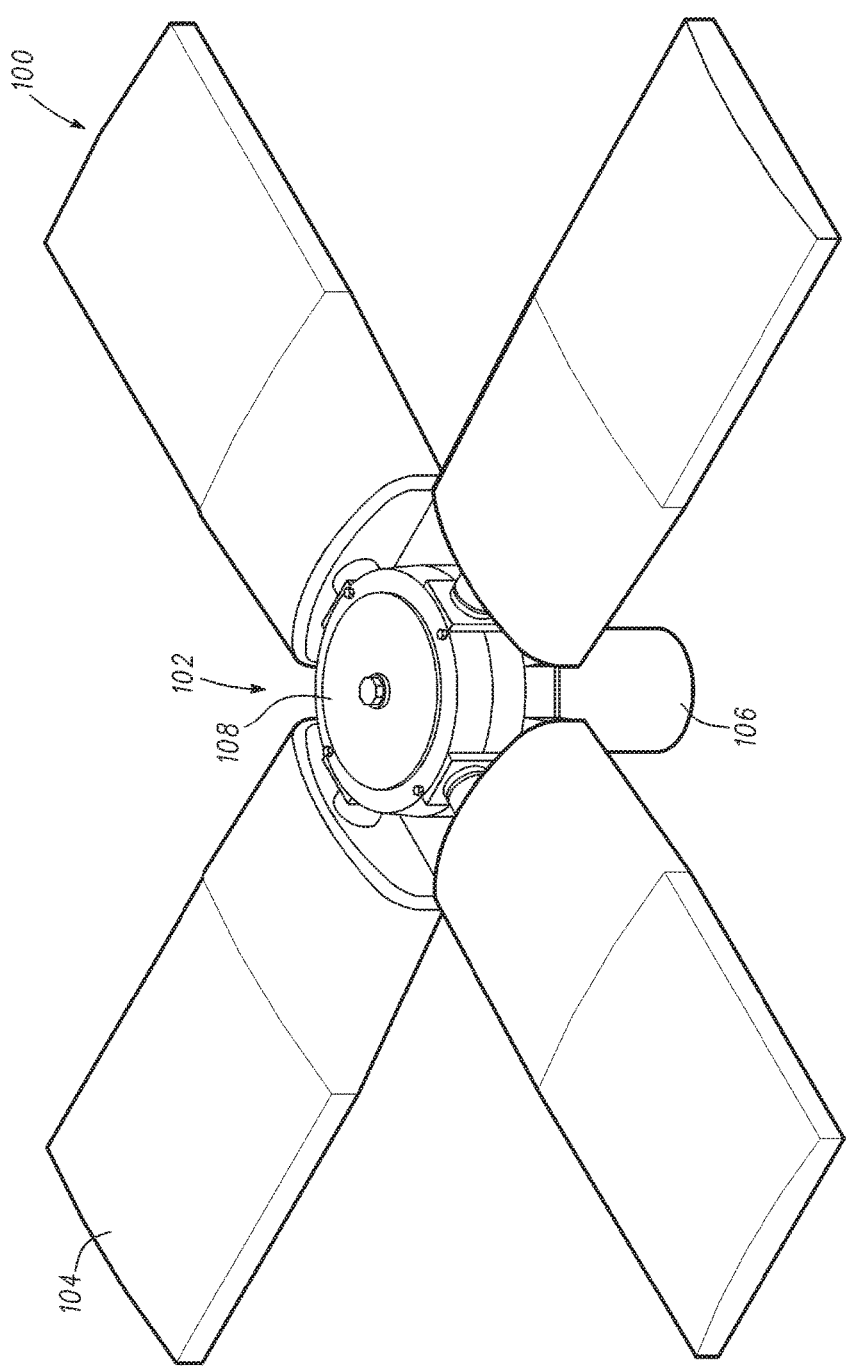
FIG. 1 is a perspective view of one example of a fixture assembly including an installed fixture mount assembly and a plurality of fixtures.

FIG. 1 shows one example of a fixture assembly 100 including a plurality of fixtures 104 coupled with a support 106 by way of an exemplary fixture mount assembly 102. As described herein, the fixtures 104 include, but are not limited to, light, audio, instrumentation, sensor fixtures or the like. The support 106 shown in FIG. 1 includes one or more work pieces including, but not limited to light posts, light poles, utility posts or poles or the like configured to position the one or more fixtures 104 at a desired position, for instance elevated above an area to be lit, an area to be observed, an area to provide a broadcast to or the like.

As shown in FIG. 1, the plurality of fixtures 104 are each coupled with the fixture mount assembly 102 provided between the fixtures 104 and the support 106. The fixture mount assembly 102 includes the fixture mount 108 and a grasping clamp 110. As will be described herein, the fixture mount assembly 102 provides an intervening component to allow for the quick, reliable and robust coupling of the fixtures 104 to the support 106 with little to no preparation of the support 106 (e.g., mapping a pattern of fasteners or holes, drilling or machining the support or the like). Even where the style of the fixtures 104 vary (e.g., have differing installation footprints shapes, sizes, functions or the like) the fixture mount assembly 102 provides an interface to readily couple the fixtures 104 with the support 106.

As further shown in FIG. 1, in an example the fixture mount assembly 102 includes a grasping clamp 110 configured to couple the fixture mount assembly 102 with the support 106. The grasping clamp 110 includes a plurality of features that facilitate the coupling of the fixture mount assembly 102 to the support 106 with little to no fastening between the fixture mount assembly 102 and the support 106 (e.g., with fasteners such as bolts, screws, rivets or the like).

Figure 2A:
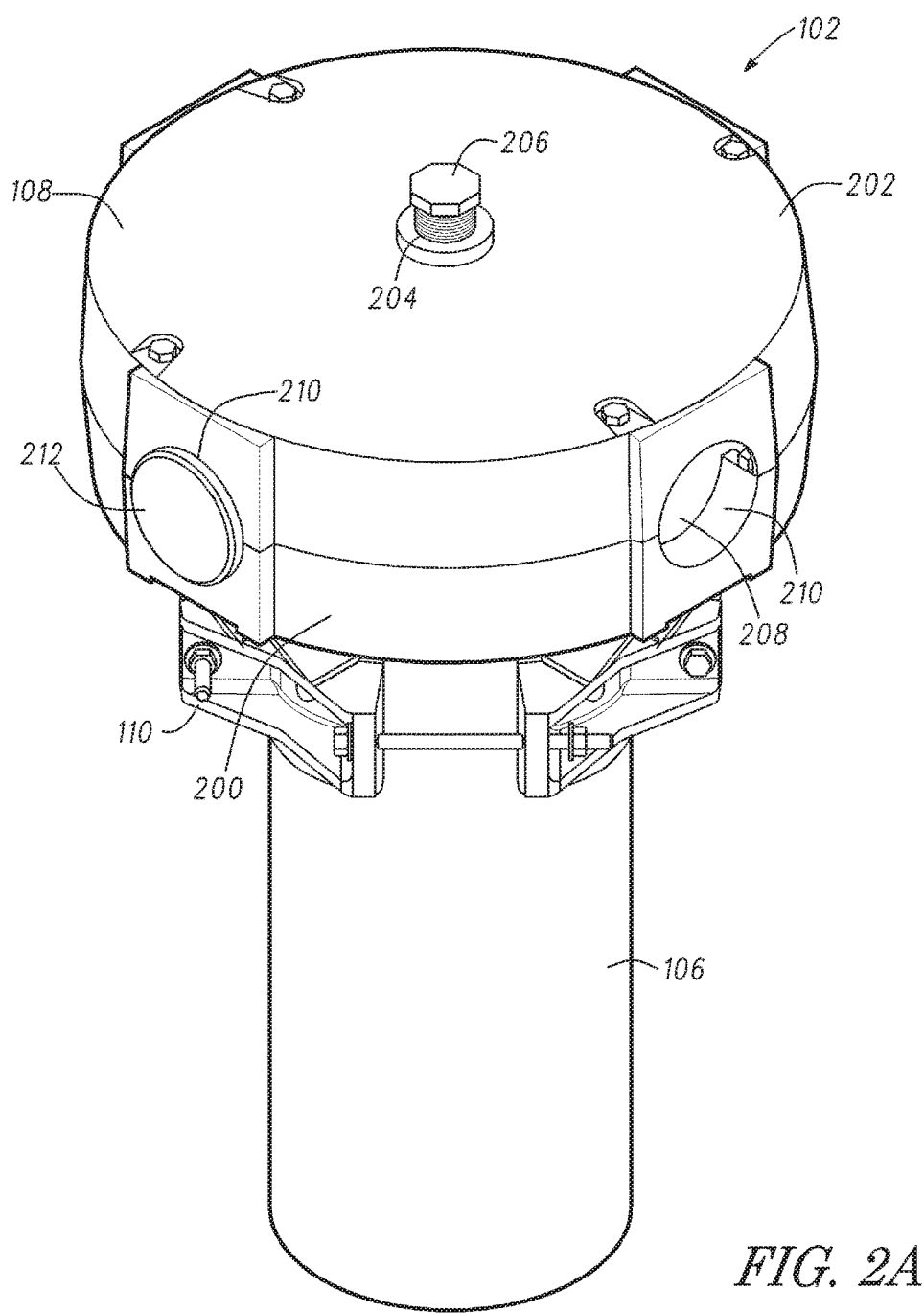
FIG. 2A is a detailed perspective view of the fixture mount assembly of FIG. 1.

Referring now to FIG. 2A, another example of the fixture mount assembly 102 is provided with the fixtures 104 removed for illustration purposes. As shown in the example, the fixture mount assembly 102 includes the fixture mount 108 and the grasping clamp 110 coupled with a mount body 200 of the fixture mount 108. The grasping clamp 110 is coupled around a support, such as support 106 previously shown in FIG. 1 and duplicated here in FIG. 2A.

In the example shown in FIG. 2A, the fixture mount 108 includes a mount body 200 having a body cover 202. The body cover 202 is in one example removable relative to the remainder of the mount body 200 to facilitate access to the interior of the fixture mount 108. Optionally a wiring cavity is provided within the fixture mount 108 to easily route and direct one or more of wiring, wiring harnesses, cables, instrumentation or the like through both of the fixture ports 210 to each of the fixtures 104 shown in FIG. 1 as well as through the support 106 shown in FIG. 2A. In an example, the writing cavity is a junction box.

As further shown in FIG. 2A, an instrument port 204 is provided in the body cover 202. In one example, the instrument port 204 includes a port plug or instrument port plug 206 sized and shaped for reception within the instrument port 204. Where desired, the installer may remove the instrument port plug 206 and install one or more instruments within the instrument port 204 for instance for communication with the fixtures such as the fixtures 104 shown in FIG. 1. One example of an instrument positioned within the instrument port 204 or extending through the instrument port is a photosensitive cell (photo cell) in communication with one or more of the fixtures 104 to provide a light operated switch the fixtures 104 where the fixtures are in one example light fixtures. Where an instrument is not used with the fixture mount assembly 102 the instrument port plug 206 is provided through the instrument port 204 to provide a sealed enclosure for the interior of the fixture mount 108.

As further shown in FIG. 2A and previously mentioned herein, one or more fixture ports 210 are provided around the fixture mount 108. As shown in FIG. 2A four fixture ports are provided at approximately ninety degree intervals. In other examples, one or more fixture ports 210 are provided with the fixture mount 108 (e.g., the fixture mount 108 includes one, two, three or more fixture ports 210). Although the fixture ports 210 are shown at a consistent elevation and interval around the mount body 200 in another example the fixture ports 210 are provided vertically and horizontally around the fixture mount 108 according to the needs for the particular application of the fixtures 104 shown in FIG. 1. For instance, fixture ports 210 are formed at varying locations (vertically) along the mount body 200 to maximize the use of space of the body or position fixtures such as instrument fixtures, above or below other fixtures, such as audio or light fixtures. In other examples, the fixtures are provided at varied intervals, in a cluster or the like (e.g., horizontally around the mount body 200). For instance, a cluster of fixture ports 210 is provided along a portion of the mount body 200 where the installer desires to direct the associated fixtures in a direction or arc (e.g., toward an athletic field, away from homes, or the like).

As will be described herein, one or more fixture anchors 208 are provided around the fixture mount 108 corresponding to each of the fixture ports 210. In one example, the fixture anchors 208 include each of the respective fixture ports 210 as well as fixture clamps provided within the fixture mount 108 to securely couple with one or more fixtures 104 including one or more fixture adapters (described herein) used for coupling a variety of differing fixtures 104 with the fixture mount assembly 102. As will be described herein, the fixture anchors 208 provide both lateral and translational retention and support of the fixtures 104 and the fixture adapters relative to the fixture mount assembly 102 and the support 106.

In other examples, where the fixture mount assembly 102 includes a plurality of fixture ports 210 but fewer than the total number of fixture ports 210 are used, one or more port plugs 212 are selectively positioned in the unused fixture ports 210 to provide and maintain a sealed environment within the mount body 200. The mount body 200 of the fixture mount 108 thereby provides a concealed environment for sensitive components including, but not limited to, wiring, wiring harnesses, cables, instrumentation or the like. With the body cover 202 in place along the remainder of the mount body 200 and one or more fixtures 104 or port plugs 212 coupled with the fixture mount assembly 102 the assembly 102 is able to facilitated robust coupling with the fixtures such as the fixtures 104 while also providing a concealed environment for any wiring, instrumentation or the like used with the fixtures 104.

Figure 2B:
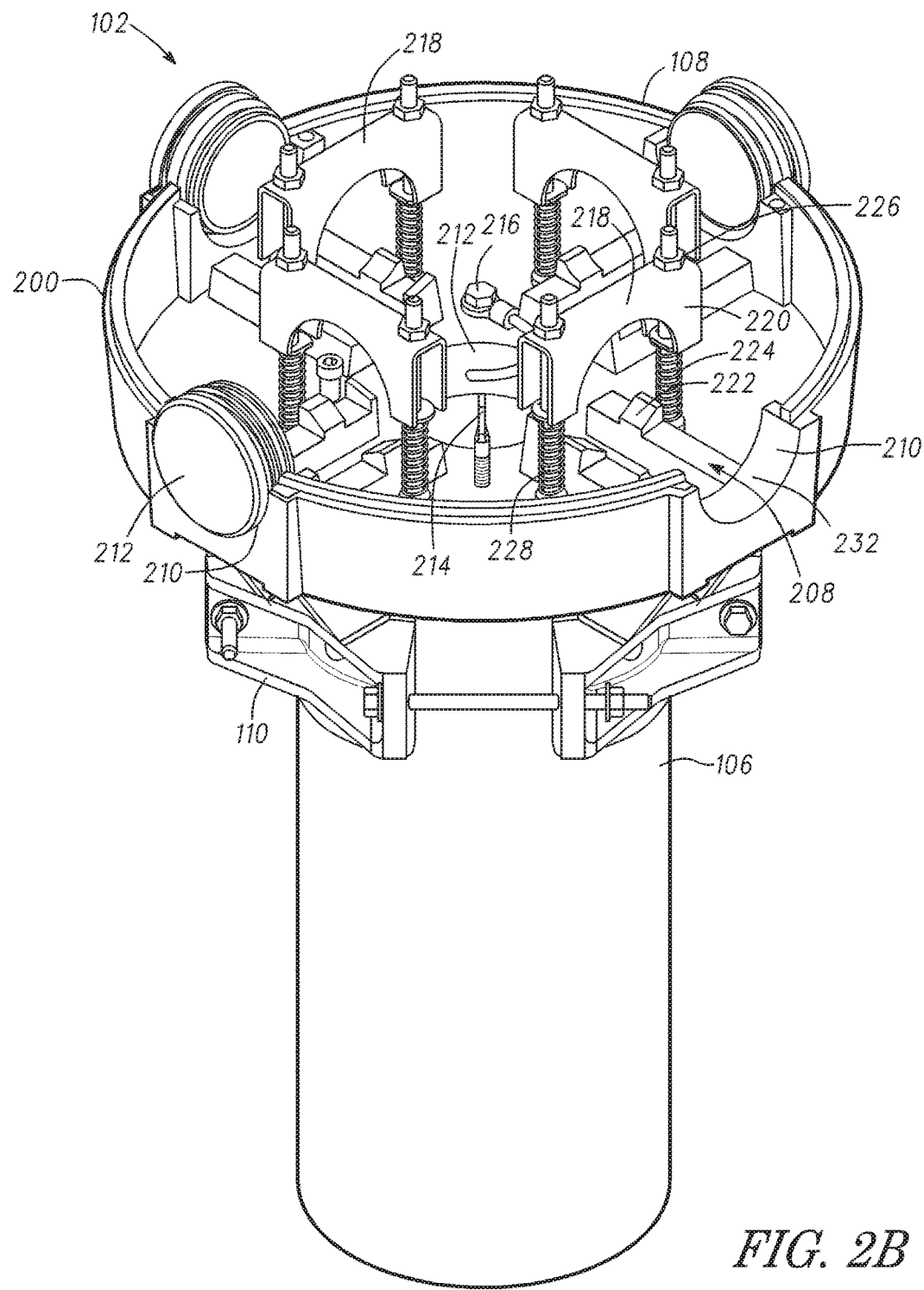
FIG. 2B is a detailed perspective view of the fixture mount assembly of FIG. 2A with the body cover removed.

FIG. 2B shows another view of the fixture mount assembly 102 having the body cover 202 (shown in FIG. 2A) removed to expose a wiring cavity 212. As shown the wiring cavity 212 is provided in the interior of the mount body 200 and provides a relatively central location for reception of wiring, instrumentation or the like from each of the fixtures 104 coupled with the fixture mount assembly 102. As further shown in FIG. 2B, in one example, the mount body 200 includes a wire post 214 positioned within the mount body 200 to facilitate the wrapping of wiring or wiring harnesses there around prior to delivery of wiring into the support 106 through the orifice of the wiring cavity 212 extending downwardly into the support 106. In another example, the mount body 200 includes a ground terminal 216 (and associated grounding wire) to provide a readily accessible ground for each of the fixtures 104 coupled with the fixture mount assembly 102.

Referring again to FIG. 2B, a plurality of examples of a fixture clamp 218 are provided at four locations within the mount body 200. As previously described herein, in one example a mount body of the fixture mount assembly includes one or more fixture anchors as opposed to the plurality of fixture anchors shown for instance in FIG. 2B. In this example, the fixture clamp 218 of each of the fixture anchors 208 includes first and second jaws 220, 222. The first jaw 220 is moveable relative to the second jaw 222. The second jaw 222 is optionally positioned along one or more adapter rails 304 (shown in FIG. 3) configured to provide a guide for the fixture 104 installation feature (or mount interface 302 describe herein) from the fixture port 210 to the fixture clamp 218. As will be described herein, with reception of a mount interface (e.g., of a fixture adapter) through one or more of the fixture ports 210 the first jaw 220 is moved relative to the second jaw 222 to clamp the mount interface therebetween and translationally immobilize the mount interface and an associated fixture (e.g., fixture 104 shown in FIG. 1) relative to the fixture mount assembly 102 and the support 106.

As further shown in FIG. 2B, in one example, the fixture clamp 218 includes one or more jaw guides 224 such as posts, rails or the like configured to hold the first jaw 220 in a relatively aligned orientation relative to the second jaw 222. The first jaw 220 is moveable along the jaw guides 224 to position the first jaw in an open configuration shown in FIG. 2B and a closed configuration shown in FIG. 3A. In another example, the fixture clamp 218 of the fixture anchor 208 includes a clamp operator 226. In the example shown in FIG. 2B, the clamp operator 226 includes one or more nuts, plugs, slides or the like configured to facilitate movement of the first jaw 220 toward the second jaw 222. For instance, with rotation of a nut as the clamp operator 226 the first jaw 220 is moved toward the second jaw 222. With a mount interface (described herein) between the first and second jaws 220, 222 (and correspondingly delivered through the fixture port 210) the first and second jaws 220, 222 engage with the mount interface and thereby immobilize the mount interface relative to the fixture mount assembly 102. As shown in the example in FIG. 2B, optionally one or more of the first and second jaws 220, 222 includes features such as knurling, ridges, tacky features such as butyl rubber feet or the like configured to readily grasp the mount interface between the first and second jaws 220, 222 and thereby prevent slipping therebetween. Optionally, installation features of the fixtures include, but are not limited to bracket tubes, posts or the like and the features are installed with the fixture anchors 208 including the fixture clamp 218 as described herein (e.g., in lieu of the mount interfaces).

In another example, and as shown in FIG. 2B, the fixture clamp 218 includes an optional jaw biasing element 228 coupled with the first jaw 220. As shown in the example, the jaw biasing element 228 is coupled along the jaw guides 224. The jaw biasing element 228 includes, but is not limited to, a spring or other elastomeric element configured to bias the first jaw 220 into the open configuration shown for instance in FIG. 2B. By biasing the first jaw 220 into the open configuration, a feature such as the mount interface of the fixture adapters (described herein) or other installation feature of a fixture is readily received between the first and second jaws 220, 222 prior to closing of the first and second jaws 220, 222 to couple the fixture with the fixture mount assembly 102. Accordingly, an installer is able to readily position the mount interface (or other installation feature) between the first and second jaws 220, 222. Once the mount interface is positioned as desired between the jaws 220, 222 the clamp operator 226 is operated, overcoming the bias of the jaw biasing element 228, to move the first and second jaws 220, 222 into engagement to thereby clamp the mount interface therebetween.

Although the fixture clamp 218 as described herein includes first and second jaws 220, 222 and an operator 226 as an example, other examples of fixture clamps are also included with the fixture clamp 218 including, but not limited to, one or more of ring clamps, interference fits, spline fittings or the like configured to reliably couple (e.g., clamp, fix, fasten or the like) a feature such as the mount interface or other fixture installation feature with the fixture mount assembly 102.

As further shown in FIG. 2B, each of the fixture anchors 208 includes a fixture port 210 as well as a fixture clamp 218. As shown in FIG. 2B, the fixture ports 210 include port walls 232 formed in the mount body 200 including the body cover 202 (removed in FIG. 2B but shown in FIG. 2A). As will be described herein, the port walls 232 cooperate with the fixture clamp 218 to reliably hold, stabilize and retain the fixture adapters (or other fixture installation features as described herein) within the respective fixture anchors 208. In one example, the port walls 232 provide lateral support to the fixture adapters (for instance, the mount interface) and the fixture clamp 218 provides translational mobilization of the mount interface. As described herein, the port walls 232 provide a complementary fit with the fixtures 104 or the fixture adapters to thereby snugly couple around features received within the fixture ports 210.

Figure 3A:
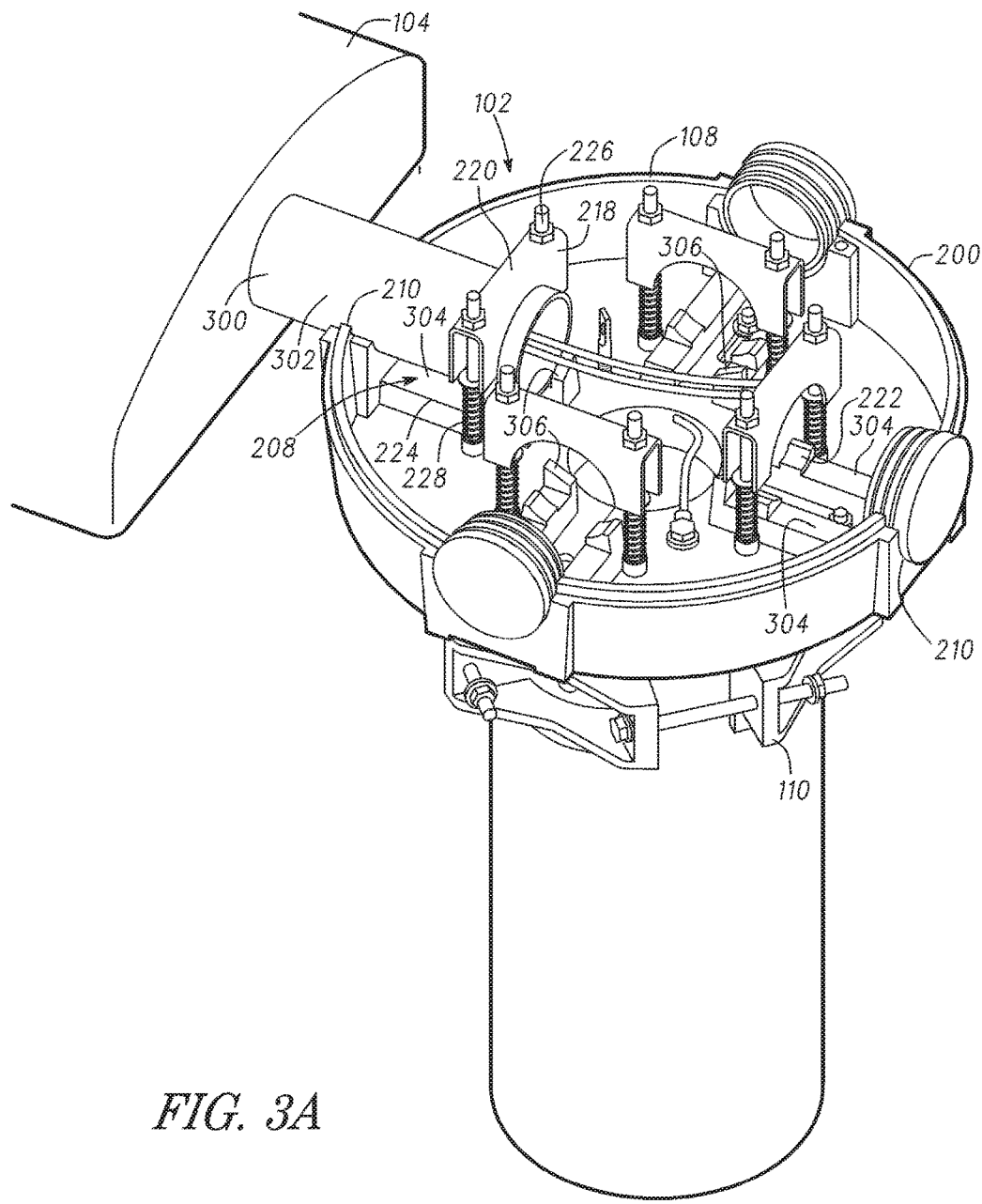
FIG. 3A is a perspective view of one example of a fixture anchor coupling a light fixture with the fixture mount assembly.

FIG. 3A shows another detailed perspective view of the fixture mount assembly 102 again with the body cover 202 removed. In this example, one exemplary fixture 104 is provided through a fixture port 210 and coupled with the fixture mount 108 with one of the fixture anchors 208 previously described herein. In the example shown in FIG. 3A, the fixture 104 is coupled with the fixture mount assembly 102 with an intervening fixture adapter 300. Fixtures 6A and 6B (described further herein) show a plurality of fixture adapters 300 of varying configurations including for instance a plurality of differing fixture interfaces.

In the example shown in FIG. 3A, the fixture adapter 300 is shown coupled with the fixture 104 and includes a mount interface 302 extending from the fixture 104 and through the fixture port 210 for coupling between the first and second jaws 220, 222 of the fixture clamp 218. As will be described herein, in one example the fixture adapter 300, specifically the mount interface 302, includes a profile (e.g., shape, size or the like) corresponding or complementary to the profile of the fixture port 210 including the port walls 232. In another example, the mount interface 302 includes a corresponding profile to the profiles of one or more of the first and second jaws 220, 222. In the example shown in FIG. 3A, the fixture adapter 300 including the mount interface 302 has a circular configuration or profile. In other examples, one or more of the fixture adapter 300 and the mount interface 302 of the fixture adapter 300 have different configurations including, but not limited to, one or more of square, rectangular, ovular, pyramidal profiles or the like. Optionally, the fixture anchors 208 including one or more of the respective fixture ports 210 and the fixture clamps 218 have corresponding or complementary configurations to the mount interface (e.g., one or more square, rectangular, ovular, pyramidal or the like). Stated another way, the fixture anchors 208 and the mount interface 302 are not limited to a round configuration. Instead another shape or size is optionally used to provide a consistent interface between fixture adapters 300 and the corresponding fixture mount assembly 102.

As further shown in FIG. 3A, the mount interface 302 is coupled with the first mount assembly 102 by way of the fixture anchor 208. As previously described herein, the fixture anchor 208 in one example includes one of the fixture ports 210 as well as one of the fixture clamps 218. The mount interface 302 is delivered through the fixture port 210 and is further delivered between the first and second jaws 220, 222 (with the optional adapter rails 304 guiding the mount interface 302 to the jaws). In one example, the first jaw 220 is biased into an open configuration with the jaw biasing elements 228 provided for instance along the jaw guides 224 shown in FIG. 3A. Once the mount interface 302 is positioned between the first and second jaws 220, 222 and optionally backstopped or engaged against a fixture stop 306 the first jaw 220 is moved relative to the second jaw 222 to clamp the mount interface 302 therebetween. For instance in one example, the clamp operator 226 is operated to move the first jaw 220 (overcoming the bias provided by the jaw biasing element 228) to engage the first jaw 220 against the mount interface 302 and correspondingly also engage the second jaw 222 against the mount interface 302. The engagement of the fixture clamp 218 (e.g., by way of the first and second jaws 220, 222) translationally immobilizes the mount interface 302 within the mount body 200 (and further immobilizes the fixture 104 relative to the mount body 200). As will be described herein, the fixture port 210 including the port walls 232 laterally supports the mount interface 302 and the fixture 104 against upward, downward and horizontal forces applied by inclement weather, gravity or the like. The adapter rails 304 optionally brace the mount body 200 at the fixture anchors 208 including the fixture ports 210 against loads transmitted from the fixtures 104 to the fixture mount 108 (e.g., lateral loads). The fixture anchor 208 thereby robustly and reliably couples the fixture 104 with any variety of fixtures including fixtures having variations in installation footprints as described herein.

Figure 3B:
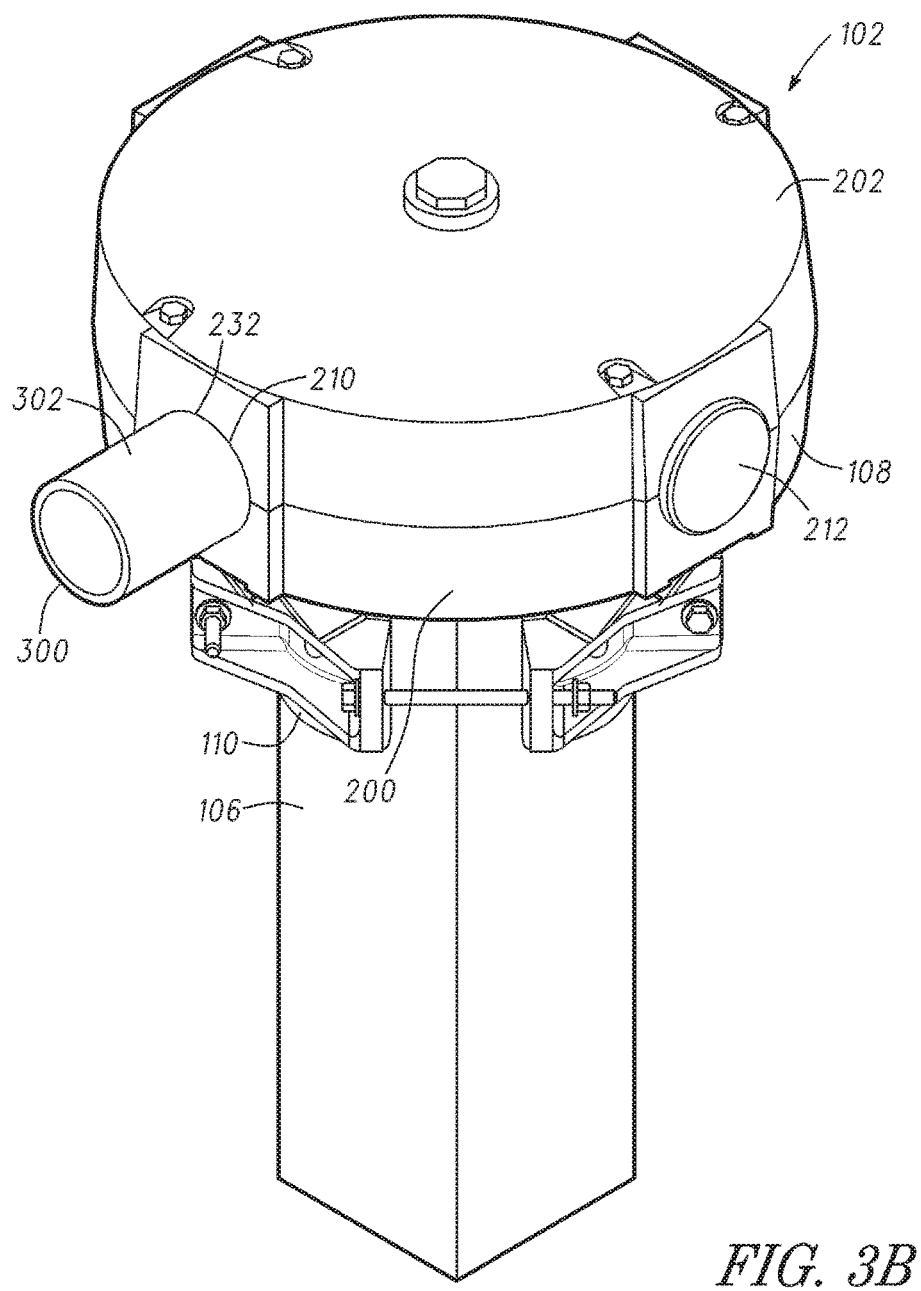
FIG. 3B is another perspective view of the fixture anchor including the body cover.

FIG. 3B shows the fixture mount assembly 102 with the body cover 202 replaced to thereby show a substantially enclosed version of the fixture mount assembly 202. As shown in FIG. 3B, the mount interface 302 and the fixture adapter 300 are positioned within the fixture port 210, and as previously shown in FIG. 3A fixed by way of the fixture anchor 208 including for instance the fixture clamp 218.

As shown in FIG. 3B, the port walls 232 of the mount body 200 provide a complimentary shape relative to the mount interface 301 The complimentary shape provides a snug coupling between the port walls 232 and the mount interface 302 to thereby reliably enclose the interior of the mount body 200 including the wiring cavity 212 as well as components, instruments, wiring and the like therein. As previously described, the port walls 232 in at least one example provide lateral support to the mount interface 302 (or installation feature of the fixture 104 itself) and cooperate with the fixture clamp 218 to immobilize the fixture adapter 300 as well as the fixture 104 coupled with the fixture adapter 300.

Further, the port walls 232 and the fixture clamp 218 are configured to couple with the consistent matching profile of the mount interfaces 302 of each of the fixture adapters 300. As will be described herein, fixture interfaces of each of the fixture adapters 300 are unique or specified for varying fixture styles including for instance differing installation footprints (bracket shapes, fastener arrangements or the like) for each of the fixture styles. In contrast, the mount interface 302 of the fixture adapters 300 is consistent across the fixture adapters 300 and able to readily couple and reliably retain fixtures 104 (coupled with the fixture adapters 300) to the fixture mount assembly 102. As previously described herein, use of the fixture adapters 300 in combination with the fixture mount 108 and the grasping clamp 110 allows for robust reliable coupling of fixtures 104 of varying styles, installation footprints and the like to substantially any support, including at least the support 106 shown for instance in FIG. 1 as well as the support 106 having a square profile as shown in FIG. 3B.

Figure 4:
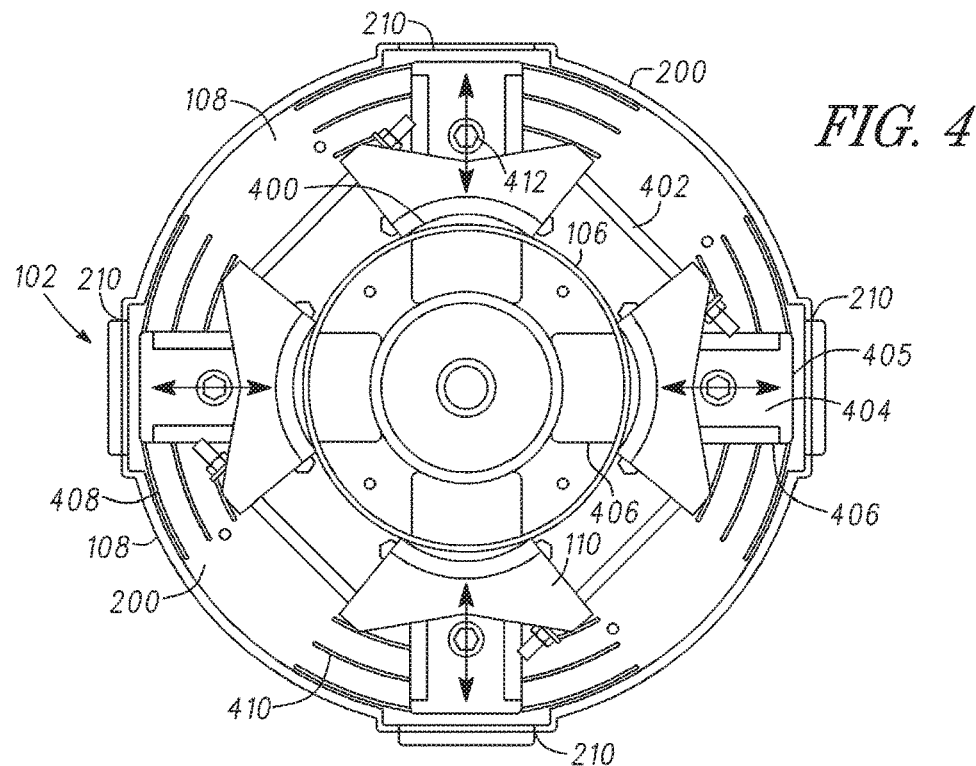
FIG. 4 is a bottom view of one example of a grasping clamp on a round support.

FIG. 4 shows a bottom view of the fixture mount assembly 102 previously described herein. The fixture mount assembly 102 includes in the example shown the fixture mount 108 coupled with the grasping clamp 110. In the example shown in FIG. 4, the grasping clamp 110 includes one or more features such as engagement faces 400 configured to move relative to the fixture mount 108. As will be described herein, the engagement faces 400 are in one example moved inwardly and outwardly (as shown with the arrows provided in FIG. 4) to selectively clamp or release a support such as the support 106 provided between the opposed faces of the engagement faces 400. The grasping clamp 110 including in an example two or more of the engagement faces 400 is able to tightly and robustly couple with the support 106 to thereby correspondingly immobilize (e.g., affix) the fixture mount assembly 102 to the support 106 including, but not limited to, a light post, a light pole, a utility post or pole, or the like. As shown in FIG. 4, the engagement faces 400 have a complementary curved profile relative to the curve profile of the support 106. Optionally, the complementary curved profile allows for robust surface to surface or multipoint coupling (as shown) to ensure reliable coupling between the fixture mount assembly 102 and the support 106.

Referring again to FIG. 4, as shown the engagement faces 400 are in one example moveably coupled with the fixture mount 108 with one or more corresponding support brackets 404. As shown in FIG. 4, in an example, each of the engagement faces 400 are provided as part of or coupled with each of the corresponding support brackets 404. The support brackets 404 are in turn moveably coupled with the fixture mount 108. As shown in FIG. 4, the support brackets 404 are movably coupled along a lower surface of the mount body 200. As further shown in FIG. 4, in another example, one or more bracket guides 406 are provided on the fixture mount 108 to guide movement of the support brackets 404 and the corresponding engagement faces 400 inwardly and outwardly for instance to couple and release the fixture mount assembly 102 from the support 106.

In the example shown in FIG. 4, the support brackets 404 are in one example retained within the bracket guides 406 with a feature such as a rail, retainer or the like. In the example shown, a locking fastener 412 is provided with each of the support brackets 404 and extends through the support bracket and into a corresponding portion of the fixture mount 108. In one example, each of the locking fasteners 412 includes a corresponding bolt extending through the mount body 200 to a corresponding nut, faceted face or the like provided within the mount body 200 (e.g., within the wiring cavity 242 as shown for instance in FIG. 2B). In cooperation with the bracket guides 406 the support bracket 404 slidably moves inwardly and outwardly relative to the support 106. In one example, movement of the support brackets 404 and the corresponding engagement faces 400 results from corresponding operation of one or more fasteners 402 coupled between two or more of the engagement faces 400. As shown in the example of FIG. 4, a plurality of fasteners 402 such as bolts, screws, brackets, rings or the like are provided between each of the support brackets 404. Tightening of these corresponding features such as the fastener 402 shown as a bolt in FIG. 4 correspondingly moves the support brackets 404 inwardly for instance towards the support 106. Continued tightening of the fasteners 402 engages the engagement faces 400 with the support 106 to thereby robustly couple the fixture mount assembly 102 with the support 106. Once coupled, the locking fasteners 412 are optionally tightened to immobilize the engagement faces 400 relative to the mount body 200 of the fixture mount 108.

As further shown in in FIG. 4, in one example, the fixture mount assembly 102 including for example the grasping clamp 110 includes a plurality of graduations such as sizing graduations 408, 410. The graduations 408, 410 provide indicia for the installer for the approximate placement of the engagement faces 400 and corresponding support brackets 404 relative to a specified size for the support 106, for instance a four inch, five inch, six inch pole or post. Referring again to FIG. 4, the sizing graduations 408 provide indicia for positioning of the support brackets 404 and the engagement faces 400 for a circular shaped support such as support 106 shown in FIG. 4. That is to say, the sizing graduations 408 provided to the left side of each of the support brackets 404 include a circular shaped indicia adjacent to the three linear indicia near the bracket ends 405 of each of the support brackets 404. Movement of the support bracket 404, for instance the bracket end 405, to each of the respective indicia accordingly positions the brackets 404 and the corresponding engagement faces 400 at a position configured to readily engage and couple the fixture mount assembly 102 with the corresponding support 106 having a size related to or corresponding to the sizing graduations 408. That is to say, the installer is able to, with knowledge of the size of the support 106 including its diameter, one or more dimensions or the like, pre-adjust the support brackets 404 within the bracket guides 406 to position the bracket ends 405 of the support brackets 404 at corresponding indicia that allow for rapid tightening of the fasteners 402 to engage the corresponding support 106 without requiring tedious and repetitive rotation of fasteners 402 to significantly move the support brackets 404 and the corresponding engagement faces 400 into engagement with the support provided between the opposed engagement faces 400.

As further shown in FIG. 4, other graduations 410 are optionally provided. As shown, the sizing graduations 410 correspond in another example to supports having a different shape relative to the circular shape shown with the support 106. In an example, the sizing graduations 410 are provided with regard to a parallelogram for instance a square, rectangle or the like. In a similar manner to the previously described sizing graduations 408, the sizing graduations 410 include a square indicia adjacent to the linear indicia of the sizing graduations 410. The sizing graduations 410 are provided to correspond to various square or rectangular supports provided between the engagement faces 400. Indicia of the sizing graduations 410 provided toward the interior of the mount body 200 relative to the exterior of the mount body indicate the support brackets 404, when moved to the corresponding graduations, are positioned for engagement with a corresponding smaller support. In contrast, positioning of the bracket ends 405 at the graduations of the sizing graduations 410 more remote from the central portion of the fixture mount position the support brackets 404 for engagement with a larger support between the engagement faces 400.

Figure 5:
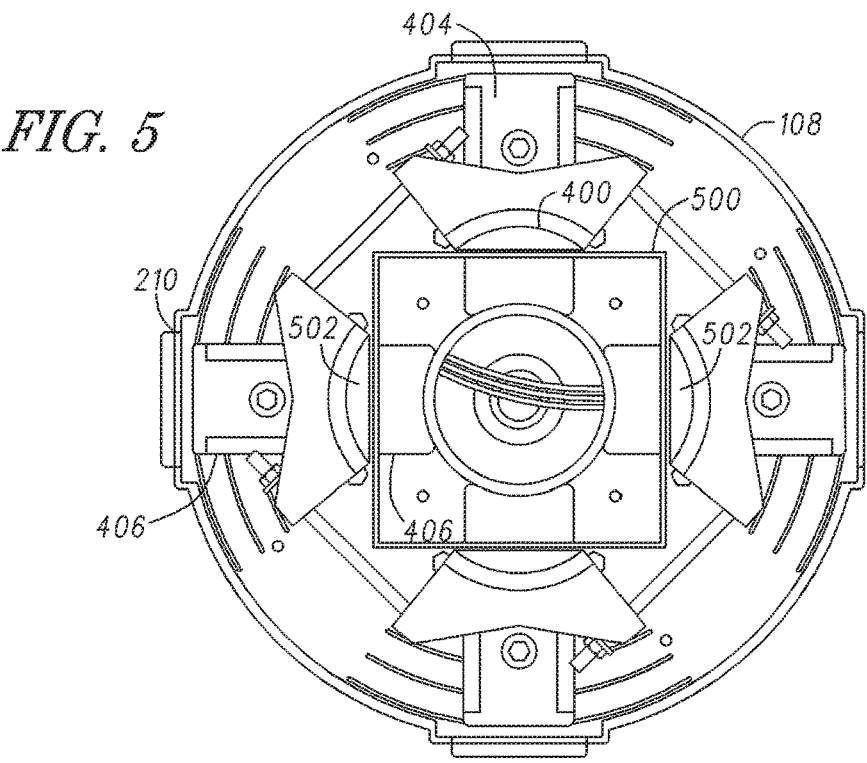
FIG. 5 is a bottom view of the grasping clamp of FIG. 4 coupled with a square support.

FIG. 5 shows another view of the fixture mount assembly 102 including an exemplary square support 500. The square support 500 is shown to provide an example of a support different from the circular support 106 shown in FIG. 4. The square support 500 is not intended to limit the supports usable with the fixture mount assembly 102. For instance, the fixture mount assembly 102 is also usable with poles and posts having a variety of shapes and profiles including, but not limited to, rectangular, circular, diamond, parallelogram, hexagonal, ovular, tapered profiles and the like.

Referring again to FIG. 5, as shown the square support 500 is coupled or engaged with the opposed engagement faces 400 including for instance the support brackets 404 coupled with the engagement faces 400. In this example, the engagement faces 400 are provided in contact with the square support 500 by way of optional support inserts 502 interposed between the engagement faces 400 and the square support 500. In the example shown, the support inserts 502 space the engagement face 400 away from the circular or curved profile previously shown in FIG. 4 and instead reshape the face 400 into a flat or linear profile for corresponding engagement along the flat or linear surfaces of the square support 500. In a similar manner to the support inserts 502, other examples of support inserts are also coupled with the engagement faces 400. In other examples, for instance, where differing support configurations are provided between the engagement faces 400 (including, but not limited to, circular, rectangular, square, diamond, ovular, triangular profiles or the like) corresponding support inserts 502 with profiles matching the supports are readily coupled along the engagement faces 400 to accordingly adjust the shape of the engagement faces for robust and reliable coupling with the corresponding support. As described herein, the support inserts 502 are optional. In another example, the engagement faces 400 (e.g., one of planar or curved faces) are coupled along various supports including rectangular, circular, diamond, parallelogram, hexagonal, ovular and tapered supports without the use of inserts. Instead, the engagement faces 400 engage with the varying supports directly in one or more of surface to surface, point or multipoint contact between each face 400 and the support. These engagements (e.g., direct engagements) between the grasping clamp 110 and the support provide a robust and reliable coupling.

Figure 6A:
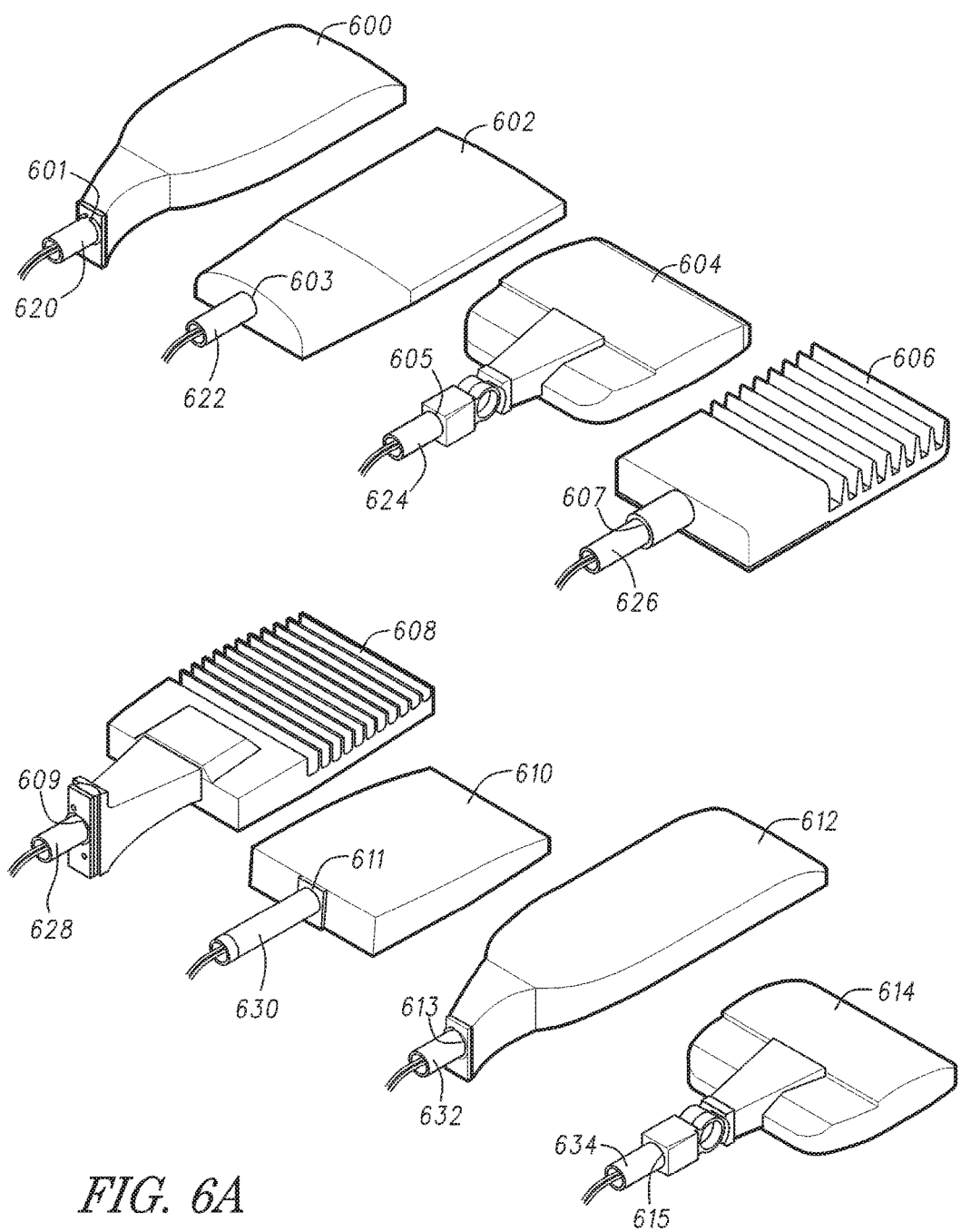
FIG. 6A is a perspective view of a plurality of light fixtures configured for coupling with the fixture mount assembly shown in FIGS. 2A, B.
Figure 6B:
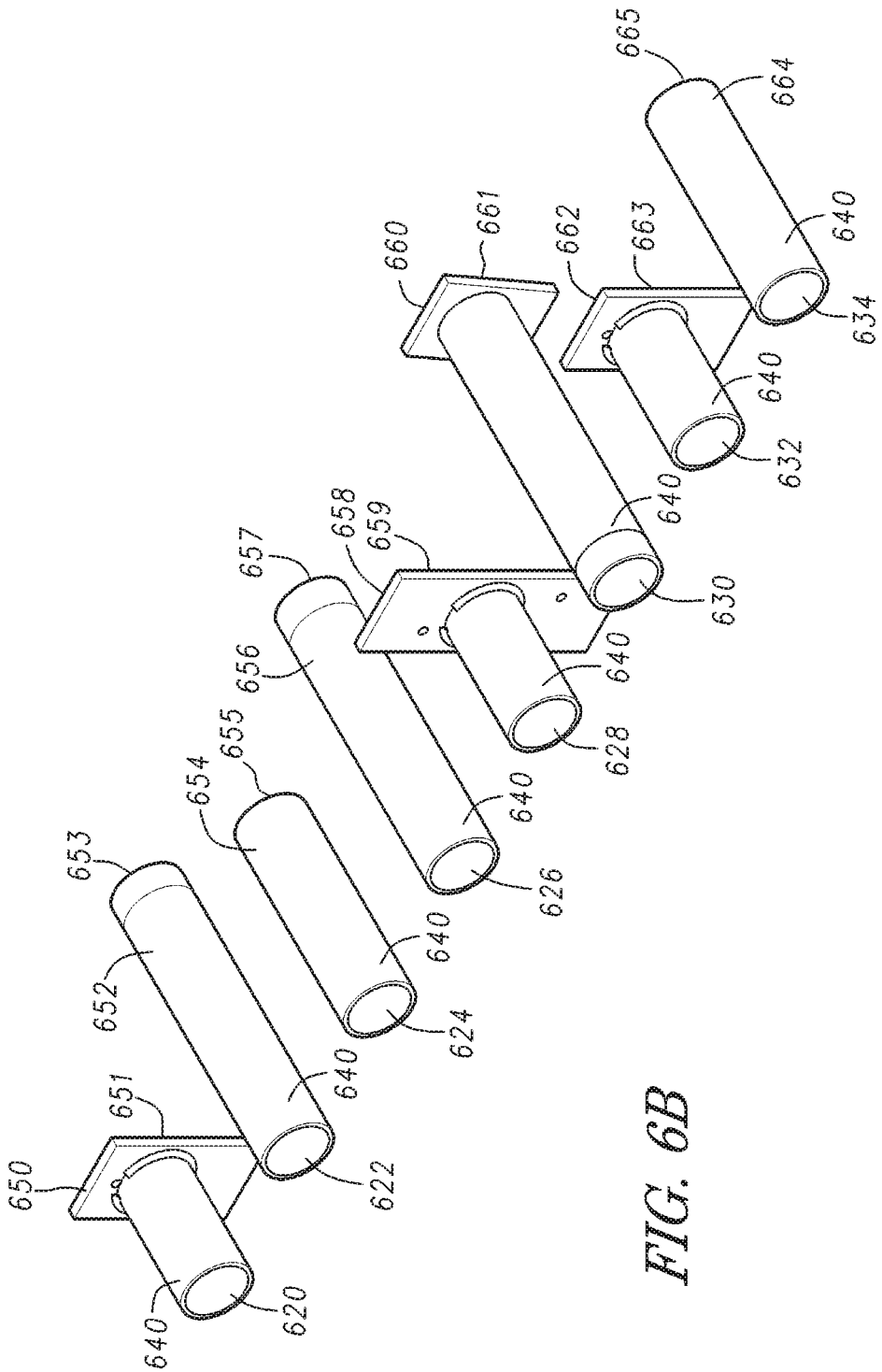
FIG. 6B is a perspective view of a plurality of fixture adapters configured for coupling with various light fixtures and including a consistent mount interface.

FIGS. 6A and 6B show various examples of fixtures 600-614 and fixture adapters 620-634. Referring first to FIG. 6A, a variety of differing styles of fixtures 600-614 are shown. The fixtures 600-614 vary with regard to one or more of size, shape and function. Some for instance include rotatable joints to allow for positioning of the fixture 600 or a portion of the fixture 600 relative to another portion of the fixture. In another example, the fixtures 600 vary with regard to instruments, lighting components, audio components or the like included with the fixtures 600. The installation footprints 601-615 vary according to data and power needs for the fixtures 600-614 and desired support for the fixtures 600-614 in an installed configuration. As shown in FIG. 6A, each of the installation footprints 601-615 is unique relative to at least one or more of the other installation footprints. Stated another way, with the fixture adapters 620-634 removed from each of the fixtures 600-614 the fixtures have one or more of differing brackets, fastener patterns (holes or fasteners), passages for wiling, instrument or the like.

As described herein, FIG. 6A illustrates a variety of non-limiting exemplary fixtures 600-614. The fixtures 600-614 are, in one example, made and sold by a variety of manufacturers. The manufacturers, as shown in FIG. 6A, use a variety of installation footprints 601-614 that vary according to the manufacturer, model of the fixture, size of the fixture or the like. The exemplary fixtures 600-614 include, but are not limited to, light fixtures such as the Acuity D Series, Size 1, DSX1; Philips Lumez Roadview RVM; Cree OSQ Large; GE Slipfitter EASC; GE EASC; Cooper Gleon; Acuity D Series, Size 2, DSX2; Cree OSQ Medium; and the like. The list provided above is non-exclusive and the exemplary fixture mount assembly 102 described herein is usable with the fixtures 600-614 shown in FIG. 6A as well as other fixtures as described herein.

As further shown in FIG. 6A, a plurality of fixture adapters 620-634 are coupled with each of the fixtures 600-614. As will be described herein, each of the fixture adapters 620 includes a fixture interface sized and shaped for coupling with the installation footprints 601-615 of each of the fixtures 600-614. That is to say, the fixture interfaces of the fixture adapters 620-634 shown as examples herein include one or more fixture footprints sized and shaped to match or correspond to the installation footprints 601-615 shown with the respective fixtures. Stated another way, the fixture adapters 620-634 include at least one end or component thereon sized and shaped for ready coupling with the respective fixtures 600-614 with little to no preparation of the fixture adapters 620-634. For instance, one or more of a pattern of fasteners or fastener holes on the fixture adapters 620-634 match the corresponding pattern of holes or fasteners on the installation footprints 601-615 of the fixtures 600-614. Similarly, the brackets, if included with the fixture adapters 620, are correspondingly shaped to the brackets (part of the installation footprints 601-615) of each of the fixtures 600-614.

FIG. 6B shows detailed views of the fixture adapters 620-634 previously described and shown in FIG. 6A. In the example shown in FIG. 6B, the fixtures 600-614 are removed to allow for a detailed view of each of the fixture adapters. As shown, each of the fixture adapters 620-634 includes respective fixture interfaces 650-664 with corresponding fixture footprints such as the fixture footprints 651-665. Each of the fixture interfaces 650-664 has a varied fixture footprint 651-665 corresponding to the installation footprints 601-615 of each of the fixtures 600-614. As previously described, the fixture interfaces 650 are provided in a pre-prepared state that allows for immediate coupling of the fixture adapters 620-634 with the corresponding fixtures 600-614. As shown, some of the exemplary fixture adapters 620-634 include fixture interfaces 650-664 having one or more brackets, tubular interfaces, fastener patterns (fastener hole arrangements) or the like configured for coupling with the corresponding installation footprints 601-615 shown for instance in FIG. 6A. The installer is thereby able to readily couple the fixture adapters 620-634 with the corresponding fixtures 600-614 onsite to thereby readily install the fixtures 600-614 with the fixture mount assembly 102 as previously described herein (and shown for instance in the example in FIG. 1 and other figures herein).

As further shown in FIG. 6B, each of the fixture adapters 620-634 includes a consistent mount interface 640 that is substantially duplicated between each of the fixture adapters 620-634. As shown for instance in FIG. 6B, the mount interfaces 640 have a consistent profile (e.g., one or more of shape, size or the like) that facilitates the ready reception of the mount interfaces 640 with the remainder of the fixture mount assembly 102 including for instance the fixture mount 108. For instance, the mount interfaces 640 are readily received within the fixture ports 210 of the fixture anchors 208 (see FIGS. 2A, B). Further, the mount interfaces 640 are configured for reception within the fixture clamps 218 of each of the fixture anchors 208. As shown for instance in FIG. 2B, the fixture clamps 218 in one example include first and second jaws 220, 222 configured for engagement with the corresponding profile of the mount interfaces 640 to thereby provide a reliable robust coupling with the fixtures 600-614 through the mount interfaces 640 of the fixture adapters 620 (and the other examples of the fixture adapters described herein). That is to say, the fixture adapters 620 each include a consistent mount interface 640 having the same profile including shape, size and the like for coupling with the corresponding fixture anchors 208 of the fixture mount assembly 102. Optionally, the mount interface 640 (and the corresponding fixture anchor 208) has a consistent size and shape common to a segment of light fixtures. For instance, the mount interface 640 has a circular shape and outer diameter of approximately 2⅜ inches. The corresponding fixture anchor 208 has a complementary shape and size.

With the system shown in FIG. 6B, including for instance a plurality of fixture adapters 620 having unique and varied fixture interfaces 650-664 (with corresponding varied fixture footprints 651-665) a plurality of varied fixtures such as the fixtures 600-614 are readily coupled with the fixture amount assembly 102 without otherwise requiring repetitive labor intensive efforts to join the fixtures to a support. Such efforts include, but are not limited to, measuring out dimensions for fasteners, applying templates for brackets and the like, forming fastener holes, providing fasteners in the support, transposing a template to the support for cutting or drilling to provide the varied interfaces needed for coupling with the installation footprints 601-615 of each of the varied fixtures 600-614. Instead, the fixture mount assembly 102 provides a consistent interface with each of the fixtures 600-614 by way of one or more fixture adapters 620-634 provided between the fixtures 600 and the fixture mount 108 and mounted in fixture anchors 208 configured to receive the adapters. The fixture mount assembly 102 thereby provides a consistent and ready to use interface and coupling device to allow for the robust coupling of a plurality of fixture types to any supports (e.g., including, but not limited to, the supports 106, 500 or the like shown herein).

Figure 7:
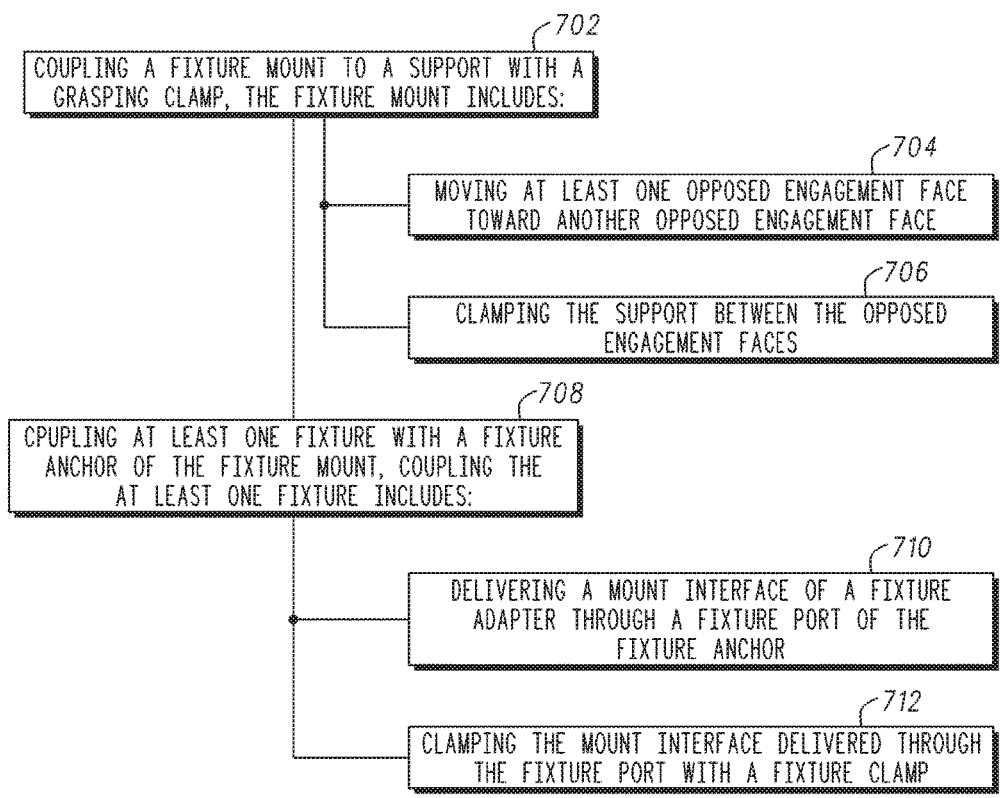
FIG. 7 is a block diagram showing one example of a method for using a fixture mount assembly.

FIG. 7 shows a block diagram of one example of a method 700 for mounting one or more fixtures such as the fixture 104 to a support such as the support 106. One example of a fixture mount assembly 102 used with the method 700 is described herein and shown for instance in FIGS. 1-6B. In describing the method 700, reference is made to one or more components, features, functions and steps previously described herein. Where convenient reference is made to the components, features, steps and the like with reference numerals. Reference numerals provided are exemplary and are non-exclusive. For instance, features, components, functions, steps and the like described in the method 700 include, but are not limited to, the corresponding numbered elements provided herein, other corresponding features described herein (both numbered and unnumbered) as well as their equivalents.

At 702, a fixture mount such as the fixture mount 108 shown for instance in FIG. 1 is coupled to a support 106 with a grasping clamp 110 (see FIG. 2A). Coupling the fixture mount 108 includes, in one example, moving at least one opposed engagement face such as the engagement face 400 toward another opposed engagement face (another engagement face 400 shown in FIG. 4). At 706, the method 700 includes clamping the support such as the support 106 between the opposed engagement faces 400. As previously described herein, in one example a fastener such as a bolt, ring or the like 402 is coupled between one or more of the engagement faces 400. Optionally, the engagement faces 400 are provided on one or more support brackets 404 that are moveably coupled with the fixture mount 108 for instance along the mount body 200. The fastener are coupled in such an example with the support brackets 404. In an example, moving the at least one opposed engagement face at 704 includes moving two or more engagement faces 400 for instance on the support brackets 404 toward each other and thereby clamping the support 106 therebetween.

At 708, at least one fixture, such as one or more of the fixtures 600-614 shown for instance in FIG. 6A, is coupled with a fixture anchor 208 shown in FIGS. 2A and 2B. At 710, coupling the at least one fixture (e.g., one or more of fixtures 600-614) includes delivering a corresponding mount interface 640 of a fixture adapter through a fixture port 210 of a fixture anchor 208 provided with the fixture mount assembly 102.

At 712, coupling the at least one fixture 600-614 with the fixture anchor 208 includes clamping the mount interface 640 of the fixture of the corresponding fixture adapter (e.g., one or more of adapters 620-634) through the fixture port 210 with a fixture clamp such as one or more of the fixture clamps 218 shown in FIGS. 2B and 3A. In one example, the fixture clamp 218 includes one or more features configured to clamp the mount interface 640 of one or more of the fixture adapters therein. For instance, the fixture clamp 218 includes in one example a first jaw 220 and a second jaw 222. One or more of the jaws 220, 222 is moveable relative to the other jaw to provide a clamping interface around a mount interface received between the first and second jaws 220, 222. For instance, a clamp operator 226 is in one example provided with the first jaw 220 and is used to move the first jaw 220 (optionally in an opposed fashion relative to a jaw biasing element 228) to close the first jaw 220 around the mount interface. The fixing of the mount interface 640 with the fixture clamp 218 immobilizes the corresponding fixture for instance one or more of the fixtures 104, 600-614 translationally within the fixture anchor 208.

In another example, the port walls 232 of the fixture port 210 (through which the mount interface 640 is delivered) provide lateral immobilization of the mount interface 640 and the associated fixture (such as the fixtures 104, 600-614) coupled with the fixture adapter. Stated another way, in at least one example each of the fixture anchors 208 provides one or more or both of translational and lateral support to a fixture such as the fixtures 104, 600-614 coupled with the fixture mount assembly 102 by way of a clamp feature such as the fixture clamp 218 as well as the fixture port 210 having the port walls 232.

Several options for the method 700 follow. In one example, the method 700 includes coupling the fixture adapter, for instance one or more of the fixture adapters 620-634 shown in FIG. 6A, to the respective fixtures 600-614 prior to delivering the corresponding mount interface (e.g., the mount interface 640) through the corresponding fixture ports 210 of the fixture mount assembly 102. In another example, the method 700 includes coupling a fixture interface such as one or more of the fixture interfaces 650-664 of the corresponding fixture adapters 620-634 to the corresponding fixtures (600-614). The fixture interfaces 650-664 described herein include corresponding fixture footprints 651-665 matching respective fixture installation footprints 601-615 of the fixtures. In another example, delivering the mount interface 640 (a consistent interface as described herein) through the fixture port 210 includes snugly engaging the mount interface 640 with one or more port walls 232 of each of the fixture ports 210. The port walls 232 and the mount interface 640 (as well as the mount interface 302 shown for instance in FIG. 3A) have a corresponding fit to facilitate the snug engagement and corresponding lateral support of the mount interface and the fixture coupled with the corresponding fixture adapter thereon.

In another example, coupling at least one fixture such as one or more of the fixtures 104, 600-614 with the fixture anchor 208 as described herein includes biasing one or more of the first or second jaws 220, 222 into an open position relative to the other opposed jaw 222, 220. In one example, one or more jaw biasing elements 228 are provided between the first and second jaws 220, 222 to bias the first jaw 220 into an open configuration and facilitate positioning of the fixture adapter, including for instance a mount interface 302, 640 as described herein, between the first and second jaws 220, 222. That is to say, the fixture adapter is readily received within the fixture clamp 218 and is clamped between the features of the fixture clamp 218 including for instance the first and second jaws 220, 222. By biasing one or more of the first and second jaws 220, 222 apart the mount interface is readily received between the jaws 220, 222 and the installer is not otherwise required to pry open the fixture clamp 218.

In another example, the fixture mount, as previously described herein in one example, includes a plurality of fixture anchors 208. Optionally, coupling the at least one fixture (one or more fixtures 104, 600-614) with one or more of the fixture anchors 208 includes coupling two or more fixtures in two or more corresponding fixture anchors 208 respectively of the plurality of fixture anchors 208 of the fixture mount assembly 102. Optionally, in another example, one or more port plugs 212 are provided at fixture anchors 208 (e.g., within the fixture ports 210) to plug the one or more fixture ports 210 and provide a sealed wiring cavity 242 to protect the interior of the fixture mount assembly 102 from the elements. The port plugs 212 are in one example provided at fixture anchors 208 where fixtures are not otherwise coupled at those respective anchors.

In another example, moving the at least one opposed engagement face 400 includes moving at least one support bracket 404 along corresponding bracket guides such as the bracket guides 406 shown in FIG. 4. The at least one support bracket 404 includes the at least one opposed engagement face 400 thereon. Referring to FIG. 4, in the example shown therein a plurality of engagement faces 400 are provided on corresponding support brackets 404. Each of the support brackets 404 is moveable relative to the other support brackets along one or more bracket guides 406. In other examples, fewer than the total number of support brackets 404 are moveable relative to the fixture mount 108. For instance, one or more of the engagement faces 400 are moveable while the remainder of the engagement faces 400 and their corresponding support brackets 404 are fixed in place. As previously described herein, after engagement of the engagement faces 400 around the support such as the support 106 one or more locking features such as locking fasteners 412 are operated to thereby fix the support brackets 404 in place and hold the fixture amount assembly 102 in tight robust engagement and coupling with the support 106.

As also previously described herein, the engagement faces 400 in one example include a profile complimentary to a profile support 106. For instance, where the support 106 has a rounded or curved configuration the engagement faces 400 include a corresponding round or curved configuration to provide one or more of multi-point contact or surface-to-surface contact between the engagement faces 400 and the support 106. Optionally, and as described and shown herein, in one example, one or more of the engagement faces 400 are modified for instance with the inclusion of one or more corresponding support inserts 502 coupled along the engagement faces 400. The engagement faces 400 are thereby modified, for instance from a curved to a flat configuration, or from a flat configuration to a curved configuration to thereby allow for the engagement of corresponding profiles between the engagement faces 400 and a support such as the support 500 shown in FIG. 5. That is to say, the inclusion of the support inserts 502 modifies the engagement faces 400 to provide an optional complimentary profile to the square support 500 to thereby facilitate the coupling of the engagement faces 400 along the square support 500. In a similar manner, one or more inserts having other profiles are provided with the grasping clamp 110 to thereby facilitate the selective coupling of the grasping clamp with a desired support such as the square support 500 or any other support having a different profile and correspondingly shaped inserts for instance supports with a hexagonal profile, ovular profile, rounded profile, triangular profile or the like.

VARIOUS NOTES & EXAMPLES

Example 1 can include subject matter such as a fixture mount assembly comprising: a fixture mount configured for coupling with one or more fixtures, the fixture mount includes: a mount body, and one or more fixture anchors coupled with the mount body, each of the one or more fixture anchors includes a fixture clamp and a fixture port extending through the mount body; and a grasping clamp coupled with the fixture mount, the grasping clamp configured to couple the fixture mount with a support, the grasping clamp includes: one or more bracket guides, and one or more support brackets, each of the one or more support brackets respectively movably coupled with a bracket guide of the one or more bracket guides.

Example 2 can include, or can optionally be combined with the subject matter of Example 1, to optionally include one or more fixture adapters, each of the fixture adapters including: a fixture interface including a fixture footprint corresponding to an installation footprint of the one or more fixtures, and a mount interface configured for coupling with the one or more fixture anchors.

Example 3 can include, or can optionally be combined with the subject matter of one or any combination of Examples 1 or 2 to optionally include wherein a shape of the mount interface corresponds to the shape of the fixture port.

Example 4 can include, or can optionally be combined with the subject matter of one or any combination of Examples 1-3 to optionally include at least first and second fixture adapters: the first fixture adapter includes a first fixture interface having a first fixture footprint corresponding to a first fixture installation footprint, and the second fixture adapter includes a second fixture interface having a second fixture footprint corresponding to a second fixture installation footprint, and the first and second fixture interfaces are different and the corresponding first and second fixture installation footprints are different.

Example 5 can include, or can optionally be combined with the subject matter of one or any combination of Examples 1-4 to optionally include wherein both of the first and second fixture adapters include matching mount interfaces configured for coupling with the one or more fixture anchors.

Example 6 can include, or can optionally be combined with the subject matter of Examples 1-5 to optionally include wherein the fixture clamp includes: a first jaw movable relative to the mount body, a second jaw, and a jaw biasing element coupled with the first jaw, the jaw biasing element biases the first jaw toward an open configuration.

Example 7 can include, or can optionally be combined with the subject matter of Examples 1-6 to optionally include wherein the first clamp includes a clamp operator configured to move the first jaw toward the second jaw.

Example 8 can include, or can optionally be combined with the subject matter of Examples 1-7 to optionally include wherein each of the one or more support brackets includes an engagement face configured for engaged with a support.

Example 9 can include, or can optionally be combined with the subject matter of Examples 1-8 to optionally include wherein the one or more support brackets includes at least first and second support brackets, and engagement faces of the first and second support brackets are opposed.

Example 10 can include, or can optionally be combined with the subject matter of Examples 1-9 to optionally include wherein the grasping clamp includes at least one fastener coupled between the first and second support brackets and the at least one fastener is configured to move at least one of the first and second support brackets and the respective engagement faces toward the other of the second and first support brackets and the respective engagement faces.

Example 11 can include, or can optionally be combined with the subject matter of Examples 1-10 to optionally include wherein the grasping clamp includes at least one fastener coupled with the one or more support brackets and the at least one fastener is configured to move the one or more support brackets.

Example 12 can include, or can optionally be combined with the subject matter of Examples 1-11 to optionally include at least one of the one or more fixtures or the support.

Example 13 can include, or can optionally be combined with the subject matter of Examples 1-12 to optionally include a fixture mount assembly comprising: a mount body; one or more fixture anchors associated with the mount body, each of the one or more fixture anchors includes: a fixture port extending through the mount body, the mount body include a port wall extending around the fixture port, and a fixture clamp including a first jaw movable relative to a second jaw; and one or more fixture adapters configured for coupling with the one or more fixture anchors, each of the one or more fixture adapters includes a mount interface and a fixture interface configured for coupling with a corresponding fixture installation footprint of a fixture, and in an installation configuration: the fixture port is configured to receive the mount interface therein, and the the fixture clamp is configured to clamp the mount interface between the first and second jaws.

Example 14 can include, or can optionally be combined with the subject matter of Examples 1-13 to optionally include wherein the port wall is configured to laterally support the mount interface in the installation configuration.

Example 15 can include, or can optionally be combined with the subject matter of Examples 1-14 to optionally include wherein the fixture clamp includes a clamp operator configured to move the first jaw toward the second jaw and clamp the mount interface between the first and second jaws.

Example 16 can include, or can optionally be combined with the subject matter of Examples 1-15 to optionally include wherein the fixture clamp is configured to translationally lock the mounting interface in the installation configuration.

Example 17 can include, or can optionally be combined with the subject matter of Examples 1-16 to optionally include wherein the second jaw is positioned on one or more adapter rails extending from the fixture port.

Example 18 can include, or can optionally be combined with the subject matter of Examples 1-17 to optionally include wherein the second jaw is interposed between the fixture port and a fixture stop, the fixture stop configured intercept the mount interface in the installation configuration.

Example 19 can include, or can optionally be combined with the subject matter of Examples 1-18 to optionally include wherein the one or more fixture anchors includes a plurality of fixture anchors positioned around the mount body.

Example 20 can include, or can optionally be combined with the subject matter of Examples 1-19 to optionally include wherein one or more of the fixture ports of the plurality of fixture anchors includes a port plug configured to close the fixture port.

Example 21 can include, or can optionally be combined with the subject matter of Examples 1-20 to optionally include wherein the mount body includes a body cover, the body cover conceals a wiring cavity within the mount body.

Example 22 can include, or can optionally be combined with the subject matter of Examples 1-21 to optionally include an instrument port extending through the mount body.

Example 23 can include, or can optionally be combined with the subject matter of Examples 1-22 to optionally include a grasping clamp coupled with the mount body, the grasping clamp includes: at least two opposed engagement faces, and at least one fastener coupled between the at least two opposed engagement faces, the at least one fastener configured to move the at least two opposed engagement faces toward and away from each other.

Example 24 can include, or can optionally be combined with the subject matter of Examples 1-23 to optionally include one or more support inserts coupled along one or more of the at least two opposed engagement faces, the one or more support inserts correspond the shape of one or more of the at least two opposed engagement faces to the shape of a support.

Example 25 can include, or can optionally be combined with the subject matter of Examples 1-24 to optionally include wherein the one or more fixture adapters includes at least first and second fixture adapters and the fixture installation footprint includes first and second fixture installation footprints: the first fixture adapter includes a first fixture interface having a first fixture footprint corresponding to a first fixture installation footprint, the second fixture adapter includes a second fixture interface having a second fixture footprint corresponding to a second fixture installation footprint, and the first and second fixture interfaces are different and the corresponding first and second fixture installation footprints are different, and the mounting interfaces of the first and second fixture adapters match and correspond to the port wall.

Example 26 can include, or can optionally be combined with the subject matter of Examples 1-25 to optionally include a method for mounting one or more fixtures to a support comprising: coupling a fixture mount to a support with a grasping clamp, coupling the fixture mount includes: moving at least one opposed engagement face toward another opposed engagement face, and clamping the support between the opposed engagement faces; and coupling at least one fixture with a fixture anchor of the fixture mount, coupling the at least one fixture includes: delivering a mount interface of a fixture adapter through a fixture port of the fixture anchor, and clamping the mount interface delivered through the fixture port with a fixture damp.

Example 27 can include, or can optionally be combined with the subject matter of Examples 1-26 to optionally include coupling the fixture adapter to the fixture prior to delivering the mount interface of the fixture adapter through the fixture port.

Example 28 can include, or can optionally be combined with the subject matter of Examples 1-27 to optionally include coupling a fixture interface of the fixture adapter to the fixture, the fixture interface having a fixture footprint corresponding to a fixture installation footprint of the fixture.

Example 29 can include, or can optionally be combined with the subject matter of Examples 1-28 to optionally include wherein delivering the mount interface through the fixture port includes snugly engaging mount interface with a port wall of the fixture port, the port wall and the mount interface having a corresponding fit.

Example 30 can include, or can optionally be combined with the subject matter of Examples 1-29 to optionally include wherein clamping the mount interface with the fixture clamp includes clamping the mount interface between first and second jaws.

Example 31 can include, or can optionally be combined with the subject matter of Examples 1-30 to optionally include wherein coupling the at least one fixture with the fixture anchor includes biasing at least the first jaw into an open position relative to the second jaw with a jaw biasing element while delivering the mounter interface through the fixture port.

Example 32 can include, or can optionally be combined with the subject matter of Examples 1-31 to optionally include wherein the fixture mount includes a plurality of fixture anchors, and comprising plugging one or more of the fixture ports of one or more of the fixture anchors with port plugs.

Example 33 can include, or can optionally be combined with the subject matter of Examples 1-32 to optionally include wherein the fixture mount includes a plurality of fixture anchors, and coupling the at least one fixture with the fixture anchor includes coupling fixtures in two or more fixture anchors, respectively, of the plurality of fixture anchors.

Example 34 can include, or can optionally be combined with the subject matter of Examples 1-33 to optionally include wherein moving the at least one opposed engagement face includes tightening at least one fastener coupled between the opposed engagement faces.

Example 35 can include, or can optionally be combined with the subject matter of Examples 1-34 to optionally include wherein moving the at least one opposed engagement face includes moving at least one support bracket along bracket guides of the fixture mount, the at least one support bracket includes the at least one opposed engagement face.

Example 36 can include, or can optionally be combined with the subject matter of Examples 1-35 to optionally include wherein opposed engagement faces have a corresponding profile to a support profile of the support, and clamping the support includes clamping the corresponding profile to the support profile.

Each of these non-limiting examples can stand on its own, or can be combined in various permutations or combinations with one or more of the examples.

The above detailed description includes references to the accompanying drawings, which form apart of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like. The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A fixture mount assembly comprising:
 a fixture mount configured for coupling with one or more fixtures, the fixture mount includes:
  a mount body, and
  one or more fixture anchors coupled with the mount body, each of the one or more fixture anchors includes a fixture port extending into the mount body and a fixture clamp recessed from the fixture port and within the mount body; and
 a grasping clamp coupled with the fixture mount, the grasping clamp configured to couple the fixture mount with a support, the grasping clamp includes:
  one or more bracket guides, and one or more support brackets, each of the one or more support brackets respectively movably coupled with a bracket guide of the one or more bracket guides.

2. The fixture mount assembly of claim 1 comprising one or more fixture adapters, each of the fixture adapters including:
   a fixture interface including a fixture footprint corresponding to an installation footprint of the one or more fixtures, and
   a mount interface configured for coupling with the one or more fixture anchors.

3. The fixture mount assembly of claim 2, wherein a shape of the mount interface corresponds to the shape of the fixture port.

4. The fixture mount assembly of claim 1 comprising at least first and second fixture adapters:
   the first fixture adapter includes a first fixture interface having a first fixture footprint corresponding to a first fixture installation footprint, and
   the second fixture adapter includes a second fixture interface having a second fixture footprint corresponding to a second fixture installation footprint, and the first and second fixture interfaces are different and the corresponding first and second fixture installation footprints are different.

5. The fixture mount assembly of claim 4, wherein both of the first and second fixture adapters include matching mount interfaces configured for coupling with the one or more fixture anchors.

6. The fixture mount assembly of claim 1, wherein the fixture clamp includes:
   a first jaw movable relative to the mount body,
   a second jaw, and
   a jaw biasing element coupled with the first jaw, the jaw biasing element biases the first jaw toward an open configuration.

7. The fixture mount assembly of claim 6, wherein the first damp includes a clamp operator configured to move the first jaw toward the second jaw.

8. The fixture mount assembly of claim 1, wherein each of the one or more support brackets includes an engagement face configured for engaged with a support.

9. The fixture mount assembly of claim 1, wherein the one or more support brackets includes at least first and second support brackets, and engagement faces of the first and second support brackets are opposed.

10. The fixture mount assembly of claim 9, wherein the grasping clamp includes at least one fastener coupled between the first and second support brackets and the at least one fastener is configured to move at least one of the first and second support brackets and the respective engagement faces toward the other of the second and first support brackets and the respective engagement faces.

11. The fixture mount assembly of claim 1, wherein the grasping clamp includes at least one fastener coupled with the one or more support brackets and the at least one fastener is configured to move the one or more support brackets.

12. The fixture mount assembly of claim 1 comprising at least one of the one or more fixtures or the support.

13. A fixture mount assembly comprising:
   a mount body;
   one or more fixture anchors associated with the mount body, each of the one or more fixture anchors includes:
   a fixture port extending into the mount body, the mount body includes a port wall extending around the fixture port, and
   a fixture clamp within the mount body and recessed from the fixture port, he fixture clamp including a first jaw movable relative to a second jaw; and
   one or more fixture adapters configured for coupling with the one or more fixture anchors, each of the one or more fixture adapters includes a mount interface and a fixture interface configured for coupling with a corresponding fixture installation footprint of a fixture, and in an installation configuration:
   the fixture port is configured to receive the mount interface therein, and
   the fixture clamp is configured to clamp the mount interface between the first and second jaws.

14. The fixture mount assembly of claim 13, wherein the port wall is configured to laterally support the mount interface in the installation configuration.

15. The fixture mount assembly of claim 13, wherein the fixture clamp includes a clamp operator configured to move the first jaw toward the second jaw and clamp the mount interface between the first and second jaws.

16. The fixture mount assembly of claim 13, wherein the fixture clamp is configured to translationally lock the mounting interface in the installation configuration.

17. The fixture mount assembly of claim 13, wherein the second jaw is positioned on one or more adapter rails extending from the fixture port.

18. The fixture mount assembly of claim 13, wherein the second jaw is interposed between the fixture port and a fixture stop, the fixture stop configured intercept the mount interface in the installation configuration.

19. The fixture mount assembly of claim 13, wherein the one or more fixture anchors includes a plurality of fixture anchors positioned around the mount body.

20. The fixture mount assembly of claim 19, wherein one or more of the fixture ports of the plurality of fixture anchors includes a port plug configured to close the fixture port.

21. The fixture mount assembly of claim 13, wherein the mount body includes a body cover, the body cover conceals a wiring cavity within the mount body.

22. The fixture mount assembly of claim 13 comprising an instrument port extending through the mount body.

23. The fixture mount assembly of claim 13 comprising a grasping clamp coupled with mount body, the grasping clamp includes:
   at least two opposed engagement faces, and
   at least one fastener coupled between the at least two opposed engagement faces, the at least one fastener configured to move the at least two opposed engagement faces toward and away from each other.

24. The fixture mount assembly of claim 23 comprising one or more support inserts coupled along one or more of the at least two opposed engagement faces, the one or more support inserts correspond the shape of one or more of the at least two opposed engagement faces to the shape of a support.

25. The fixture mount assembly of claim 13, wherein the one or more fixture adapters includes at least first and second fixture adapters and the fixture installation footprint includes first and second fixture installation footprints:
   the first fixture adapter includes a first fixture interface haying a first fixture footprint corresponding to a first fixture installation footprint,
   the second fixture adapter includes a second fixture interface having a second fixture footprint corresponding to a second fixture installation footprint, and the first and second fixture interfaces are different and the corresponding first and second fixture installation footprints are different, and the mounting interfaces of the first and second fixture adapters match and correspond to the port wall.

* * * * *

UNITED STATES PATENT AND TRADEMARK OFFICE
CERTIFICATE OF CORRECTION

PATENT NO. : 10,371,164 B2
APPLICATION NO. : 15/040342
DATED : August 6, 2019
INVENTOR(S) : Koonce et al.

Page 1 of 1

It is certified that error appears in the above-identified patent and that said Letters Patent is hereby corrected as shown below:

In the Claims

In Column 22, Line 2, in Claim 13, delete "he" and insert --the-- therefor

In Column 22, Line 45, in Claim 23, after "with", insert --the--

In Column 22, Line 63, in Claim 25, delete "haying" and insert --having-- therefor Signed and Sealed this
Third Day of November, 2020

Andrei Iancu
*Director of the United States Patent and Trademark Office*